Jan. 14, 1969   J. J. DELANEY   3,421,391
INDEXING MECHANISM FOR ROTARY TABLE
Filed Nov. 10, 1966   Sheet 1 of 2

INVENTOR.
JOHN J. DELANEY
BY
Cushman, Darby & Cushman
ATTORNEYS

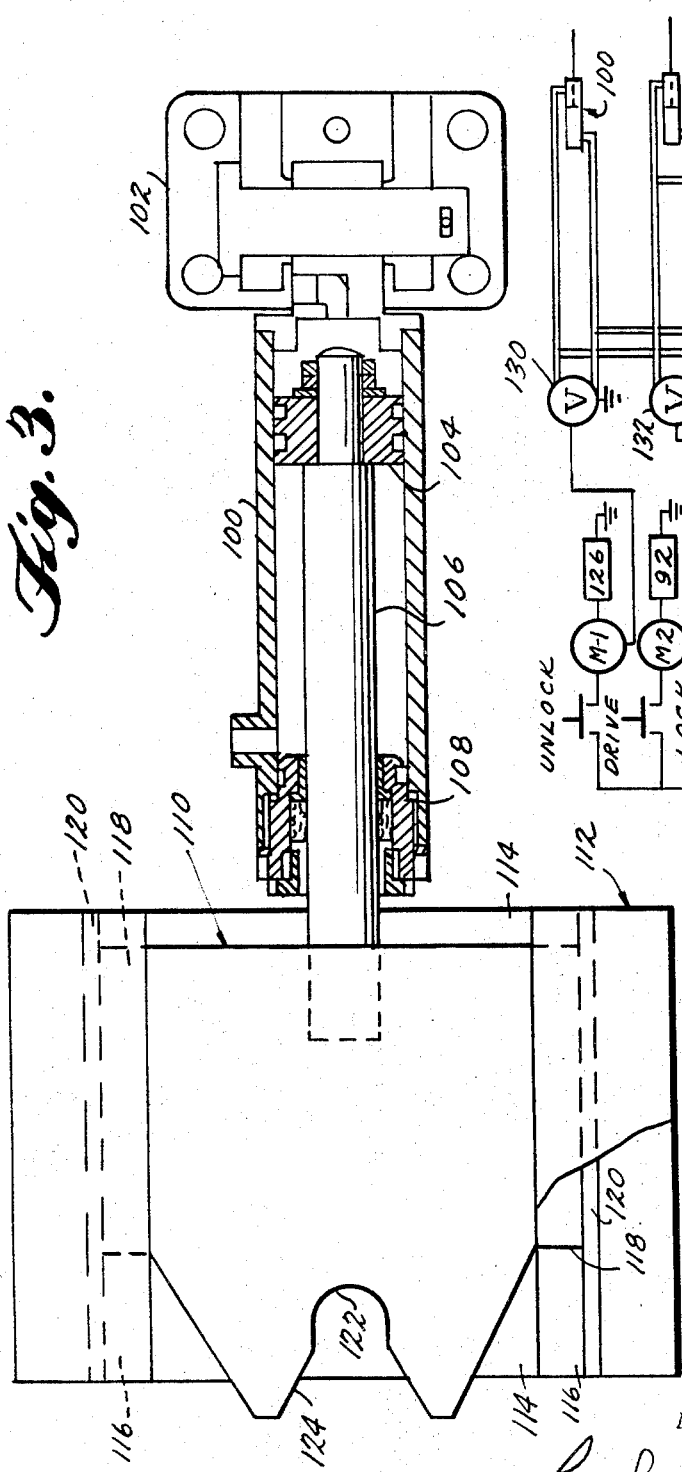

United States Patent Office 3,421,391
Patented Jan. 14, 1969

3,421,391
INDEXING MECHANISM FOR ROTARY TABLE
John J. Delaney, West Pittston, Pa., assignor to
Medico Industries Inc., Pittston, Pa., a corporation of Pennsylvania
Filed Nov. 10, 1966, Ser. No. 593,449
U.S. Cl. 74—822                                    7 Claims
Int. Cl. B23g 17/02

ABSTRACT OF THE DISCLOSURE

An indexing mechanism for a rotatable table includes two hydraulic rams one of which is swingable about the axis of rotation of the table and adapted upon extension to engage one of a plurality of index pins projecting from the table. The second ram is pivoted at one end for swinging movement about an axis parallel to the axis of rotation and is pivotally connected at its other end to the first ram whereby alternate extension and contraction of the second ram reciprocates the first ram through an arc.

---

This invention relates to indexing mechanisms for rotary tables and the like and in particular to an indexing mechanism which employs hydraulically operated pistons to rotate a table or the like through a series of predetermined arcs.

The indexing mechanism of the present invention is particularly adapted for use with a rotary mold table in conjunction with an injection molding machine. However, the mechanism has general utility in any machine where it is desired to rotate a table or the like through a sequence of accurately measured arcs.

The indexing mechanism includes a pair of rams, preferably hydraulically operated rams, which are connected together and extended and retracted in a sequence such that full strokes of the first ram rotate the second ram through a predetermined arc first in one direction and then in an opposite direction. The second ram is alternately extended and retracted into and out of engagement with the rotary table or the like in such a manner that during one stroke of the first ram the second ram is in engagement with the table and rotates the latter. During the opposite stroke of the first ram the second ram is out of contact with the table and is returned to its initial position.

The invention will be further understood from the following detailed description taken with the drawings in which FIGURE 1 is a schematic elevational view of an injection molding machine which includes a rotary table;

FIGURE 3 is a fragmentary sectional detail view, on an enlarged scale, taken on the line 3—3 of FIGURE 1; and FIGURE 4 is a simplified schematic illustration of a control system for the mechanisms of FIGURES 2 and 3.

Figure 1:
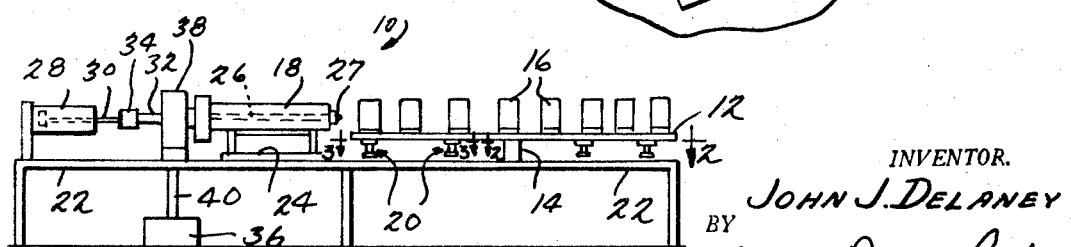

FIGURE 1 illustrates an injection molding machine 10 having a mold-carrying horizontal rotary table 12 which is driven by the indexing mechanism of the present invention. The table is rotatably mounted on a fixed vertical shaft 14 and carries on its upper surface a plurality of circumferentially spaced molds 16 each of which is disposed so as to be placed in alignment with an injection head 18 as the table 12 is rotated through a sequence of small arcs. A plurality of circumferentially spaced indexing pins 20, only four of which are shown, depend from the table 12 for engagement by the indexing mechanism of FIGURE 2. In the interest of simplicity the indexing mechanism has not been shown in FIGURE 1, but it will be understood from the position of the section line 2—2 that the mechanism is disposed between the table 12 and a fixed main frame 22. The injection head 18 is linearly movable so as to be capable of engagement with whichever mold 16 is in alignment therewith. The mounting for the injection head 18 may take any convenient form and, as shown, includes a frame 24 which is slidably mounted on the fixed main frame 22. Rails (not shown) or other guides may be employed to direct the frame 24 in a straight line path. The injection head 18 is provided internally with a rotary feed screw 26 which in operation forces plastic from a nozzle 27 under high pressure.

Movement of the injection head 18 is obtained with a hydraulic ram 28 which is disposed for extension and retraction in the direction of the longitudinal axis of the head 18. The piston shaft 30 of the ram 28 is connected with an extension 32 of the rotary feed screw 26 by means of a fitting 34 which permits the extension 32 to rotate while permitting the piston shaft 30 to be nonrotatable. Rotation of the shaft extension 32 is obtained by means of a fixed motor 36 which is drivingly connected to the extenion 32 through a spline drive 38. Specifically, the extension may be externally splined and meshed with an internally splined member which is positively driven from the motor 36 as by a belt drive 40. The feed screw 26 is mounted in suitable bearings within the injection head 18 so that upon extension of the ram 28 the feed screw 26, extension 32 and injection head 18 move as a unit toward the rotary table 12. When the nozzle 28 engages a mold 16 the motor 36 is actuated and the extension 32 and feed screw 26 are rotated so as to inject plastic into the mold 16. When the mold 16 has been filled, the motor 36 is stopped and the ram 28 is retracted. One table 12 is then rotated by the indexing mechanism of FIGURE 2 through an arc which aligns the next mold 16 with the injection head 18. Further details of the injection part of the molding machine 10 may be found in Son and Delaney application, Ser. No. 303,484, filed Aug. 21, 1963, now Patent No. 3,310,839.

Figure 2:
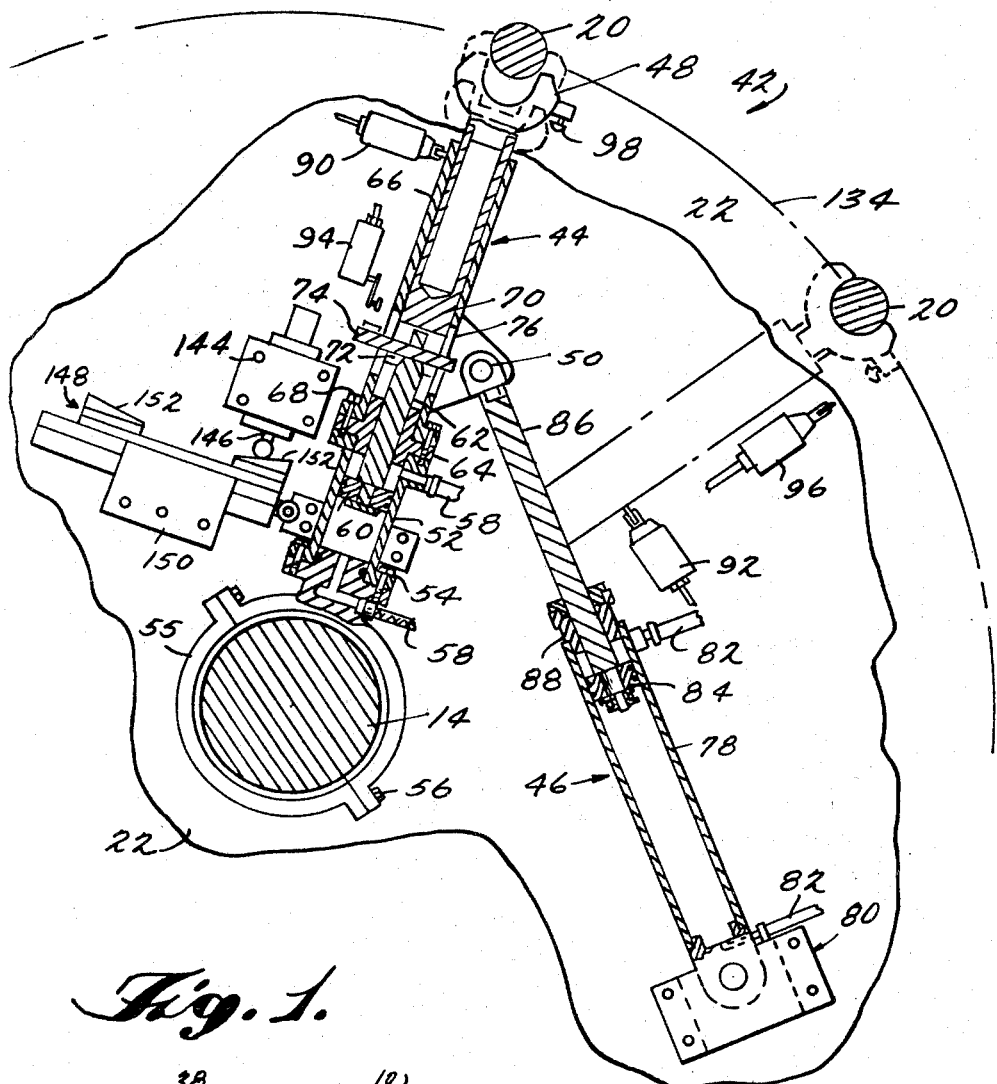
FIGURE 2 is a fragmentary sectional detail view, on an enlarged scale, on the line 2—2 of FIGURE 1.

Referring to FIGURE 2, there is shown an indexing mechanism 42 embodying the principles of the present invention. The major part of the mechanism 42 are two hydraulic ram assemblies 44 and 46 one of which (44) intermittently grips one of the indexing pins 20 on the rotary table 12 and the other of which (46) intermittently drives the gripping ram assembly 44 through a predetermined arc. The outer end of the gripping ram assembly 44 carries a claw 48 which is internally contoured to mate with the periphery of the indexing pins 20. The inner end of the gripping ram assembly 44 is pivotally mounted for rotation about the fixed shaft 14 so that the axis of the ram assembly 44 extends radially of the shaft 14 in a plane parallel to the plane of the rotary table 12. The driving ram assembly 46 is pivotally mounted on both ends, one end being pivoted to the fixed frame 22 and the other end being pivoted at 50 to the gripping ram assembly 44 intermediate the ends of the latter. In operation the gripping ram assembly 44 is extended until the claw 48 engages an indexing pin 20 and then the driving ram assembly 46 is retracted so that the gripping ram assembly 44 and the rotary table 12 are rotated through an arc the length of which is determined by the stroke of the driving ram assembly 46. After a mold 16 has been filled, the gripping piston assembly 44 is retracted and the driving ram assembly 46 is extended so as to return the gripping ram assembly 44 to its initial position.

Referring specifically to the construction of the gripping ram assembly 44 it will be seen that the inner end portion consists of a flanged cylinder 52 which is bolted at 54 to a split ring assembly 55. The two parts of the split ring assembly are bolted together at 56 in surrounding relationship to the fixed shaft. The interior of the cylinder 52 communicates at opposite ends with two fluid pressure connections 58, one of which includes a passage through a part of the split ring assembly 55. Within the cylinder 52 is a slidable piston 60 carried at one end of a piston rod 62. The piston rod 62 extends outwardly through a suitable sealing member 64 which closes the outer end of the cylinder 52. The sealing member 64 is held in place by being clamped between the outer end of the cylinder 52 and the inner end of a coaxial sleeve 66, the latter being secured in place with bolts 68.

Within the sleeve 66 there is slidably mounted a plunger member 70 which carries the claw 48 at its outer end. The inner end of the plunger member 70 is defined by a pair of spaced apart ears 72 which receive between them a projection on the end of the piston shaft. A bar 74 passes transversely through the ears 72 and the projection to connect the plunger 70 to the piston shaft 62. The ends of the bar 74 project outwardly of the sleeve through longitudinal slots 76 in the latter.

The driving ram assembly 46 is constructed of a cylinder 78 having a closed end which is pivotally mounted on the fixed frame 22 for pivotal movement about an axis extending parallel to the axis of the fixed shaft 14. The mounting includes a bracket 80 which is spaced radially outward of the fixed shaft 14 at a location in advance of the gripping ram assembly 44 with respect to the intended direction of movement of the table 12. Hydraulic connections 82 are provided at the ends of the cylinder 78 on opposite sides of a piston 84. The piston 84 is carried by a piston rod 86 which extends out of the cylinder 78 through a sealing member 88. The outer end of the piston rod 86 is pivotally fixed at 50 to the sleeve 66 of the gripping ram assembly 44 so that extension and retraction of the piston 84 reciprocates the gripping ram assembly 44 along an arcuate path.

Automatic control of the operation of the ram assemblies 44 and 46 is obtained, in part, by the use of limit switches disposed so as to sense the ends of the strokes of the ram assemblies. Conveniently, the switches are mounted on the fixed frame 22. As shown, there are a pair of limit switches 90 and 92 which will be engaged by the sides of the gripping assembly 44 upon substantially complete extension and substantially complete retraction of the drive assembly 46. Another pair of limit switches 94 and 96 are disposed so as to sense substantially complete extension and retraction of the gripping assembly 44. The switch 94 is adapted to be engaged by the bar 74 when the assembly 44 has been extended, and the switch 96 is adapted to be engaged by a button 98 on the claw when the assembly 44 has been retracted.

Referring to FIGURE 3, there is shown a hydraulically operated latch mechanism for locking the rotary table 12 when a mold 16 is being filled. The mechanism includes a hydraulic cylinder 100 extending parallel to a radius of the table 12 and secured at its inner closed end to the fixed main frame 22 by a bracket 102. A piston 104 is carried within the cylinder 100 on a piston rod 106 which extends through a sealing element 108 toward the periphery of the table 12. The outer end of the piston rod carries a latch plate 110 which is slidably mounted in a bracket 112 fixed to the main frame 22. The bracket 112 has a main longitudinal channel 114 in which the body of the latch plate 110 rides and a pair of oppositely disposed longitudinal grooves 116. Each side of the latch plate is provided with a flange 118 of lesser thickness than the body of the plate 110, these flanges engaging the walls of the grooves 116. As shown, the outer wall of each groove is provided with a bearing strip 120. The outer end of the latch plate 110 is provided with a semicircular cutout 122 which is continuous with a tapered guide notch 124. The cutout 122 is adapted to engage one-half the periphery of any one of the indexing pins 20 and thereby prevent rotation of the table 12. To this end, each of the pins 20 has a center portion of reduced cross section which is complementary to the cutout. The upper and lower end portions of the pins 20 are of greater cross section and abut the upper and lower surfaces of the latch plate 110 when the latter has been extended by the piston 104. The latch plate 110 therefore restrains vertical as well as lateral movement of the table 12.

The sequential operation of the indexing and locking parts may be controlled manually or by an automatic control circuit. FIGURE 4 illustrates schematically one form of a manual control circuit embodying several automatic features provided by the limit switches 90, 92, 94 and 96. It is assumed that the latch mechanism of FIGURE 2 has associated therewith limit switches 126 and 128 which sense full retraction and full extension, respectively, of the latch plate 110. Assuming that both the latch plate 110 and the claw 48 are in extended positions in engagement with their respective indexing pins 20, the operation of the system is as follows.

An "Unlock" push button on a suitable control panel is manually depressed. Current flows through the coil of a relay M–1 and through the normally closed limit switch 126. This closes the relay contacts so that current flows to a solenoid valve 130 to open the latter and retract the lock cylinder 100. When the cylinder engages the actuating lever of the limit switch 126, the latter opens the circuit through the relay coil so that the contacts open and break the circuit to the valve 130.

Then the operator depresses a "Drive" push button. Current flows through the coil of a relay M–2 and through the normally closed limit switch 92. The closed relay contacts pass current to a solenoid valve 132 which opens to retract the drive ram assembly 46. Retraction of the assembly 46 swings the gripping assembly 44 clockwise as viewed in FIGURE 2, and this swings the rotary table 12 through an arc along the line 134 inasmuch as the claw 48 is in engagement with one of the index pins 20. When the assembly 44 engages and opens the limit switch 92, the contacts of the relay M–2 open and break the circuit to the valve 132.

The operator then depresses a "Lock" push button. Current passes through the coil of a relay M–3 and through the normally closed limit switch 128. The closed relay contacts pass current to a solenoid valve 136 which opens to extend the lock cylinder 100. When the latter is fully extended, the switch 128 opens and breaks the circuit to the valve 136. Depressing the "Lock" push button also passes current through the normally closed limit switch 96 through a delay timer D to a solenoid valve 138. The valve opens and retracts the gripping assembly 44 after the lock cylinder 100 has locked the table 12. When the switch 96 is opened by the button 48, the valve 138 closes. The operator now effects filling of whichever mold 16 is aligned with the injection head 18, this operation including extending the ram 28 to move the injection head into engagement with a mold 16 and driving the feed screw 26 to inject plastic through the nozzle 27 into the mold 16.

After the mold 16 has been filled and the injection head retracted, the operator presses a "Recycle" push button. Current flows through the coil of a relay M–5 and through the normally closed limit switch 90. The closed relay contacts pass current to a solenoid valve 140 which opens to extend the drive ram assembly 46 so as to return the gripping ram assembly 44 to the position shown in FIGURE 2. When the assembly 44 engages and opens the switch 90 the relay contacts open and break the circuit to the valve 140. Depressing the "Recycle" push button also passes current through the normally closed limit switch 94 through a delay timer D to a solenoid valve 142. The valve opens and extends the gripping ram assembly 44 after the latter has been returned to its FIGURE 2 position. When the switch 94 is opened by the bar 74, the valve 142 closes. The equipment is then ready for another cycle. It will be understood that the above sequence will, in practice, be suitably interlocked with the movements of the injection head 18 and feed screw 26 so that damage to the equipment will be avoided. It will be appreciated, also, that the driving ram assembly may be employed to rotate the table 12 upon extension rather than on retraction.

The hydraulic circuit for the drive ram assembly 46 may also include a conventional deceleration valve 144 (FIGURE 2) for decelerating the action of the ram assembly 46 at each end of its stroke. As illustrated, the deceleration valve 144 includes a plunger 146 which is moved into the body of the valve by a cam 148 pivotally carried by the ram assembly 44. The cam 148 is slidably mounted in a bracket 150 which is mounted on the fixed frame 22. Two inclined cam surfaces 152 are provided on the cam for urging the plunger 146 into the valve 144 as the ram assembly 44 nears the ends of its arcuate movement.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. In an apparatus of the type including a rotary table or the like and an indexing mechanism for sequentially revolving the table through a series of arcs about a fixed axis, the improved indexing mechanism which comprises a first extensible and retractable ram assembly disposed in a plane parallel to said table and having a fixed portion and a movable portion; means mounting said fixed portion for pivotal movement about said fixed axis; a table-engaging member carried by said movable portion for interlocking with said table upon operation of said first ram; a second extensible and retractable ram assembly disposed in a plane parallel to said table and having a fixed portion and a movable portion; means mounting said fixed portion of said second ram assembly for pivotal movement about a fixed axis parallel to and spaced from said first-mentioned fixed axis; and means pivotally connecting said movable portion of said second ram assembly to said fixed portion of said first ram assembly whereby alternate extension and retraction of said second ram will reciprocate said first ram through an arc; and control means for operating said first ram assembly to interlock said member with said table and to then operate said second ram assembly to swing said first ram assembly and said table through an arc.

2. Apparatus as in claim 1 wherein each of said ram assemblies includes a hydraulic cylinder and a piston slidable within said cylinder.

3. Apparatus as in claim 1 wherein said table is mounted for rotation about a fixed shaft and wherein said means for pivotally mounting said first ram assembly includes a sleeve-like member carried on said fixed shaft and rotatable relative thereto.

4. Apparatus as in claim 1 wherein said table carries a plurality of circumferentially spaced pins projecting at right angles to the plane of said table and wherein said table-engaging member is contoured to mate with a portion of the periphery of said pins.

5. Apparatus as in claim 4 including a latch member having a surface contoured to mate with a portion of the periphery of said pins, means for moving said latch member into and out of engagement with one of said pins in a direction generally radial with respect to said fixed axis, and fixed guide means for restraining lateral movement of said latch member.

6. Apparatus as in claim 1 wherein said control means includes four limit switches disposed to sense the ends of the strokes of the ram assemblies.

7. Apparatus as in claim 6 wherein two of said switches are disposed to be engaged by the opposite sides of said first ram assembly upon swinging movement thereof and wherein two of said switches are disposed to be engaged by the movable portion of said first ram assembly upon extension and retraction thereof.

References Cited

UNITED STATES PATENTS

| | | | |
|---|---|---|---|
| 2,421,327 | 5/1947 | Hallowell | 74—822 XR |
| 2,949,049 | 8/1960 | Doemer | 74—822 |
| 3,192,800 | 7/1965 | Kostur | 74—822 |

FRED C. MATTERN, JR., *Primary Examiner.*

JAMES A. WONG, *Assistant Examiner.*